Aug. 14, 1951     A. P. LIEN ET AL     2,564,073
DISPROPORTIONATION OF XYLENES
Filed Aug. 25, 1948
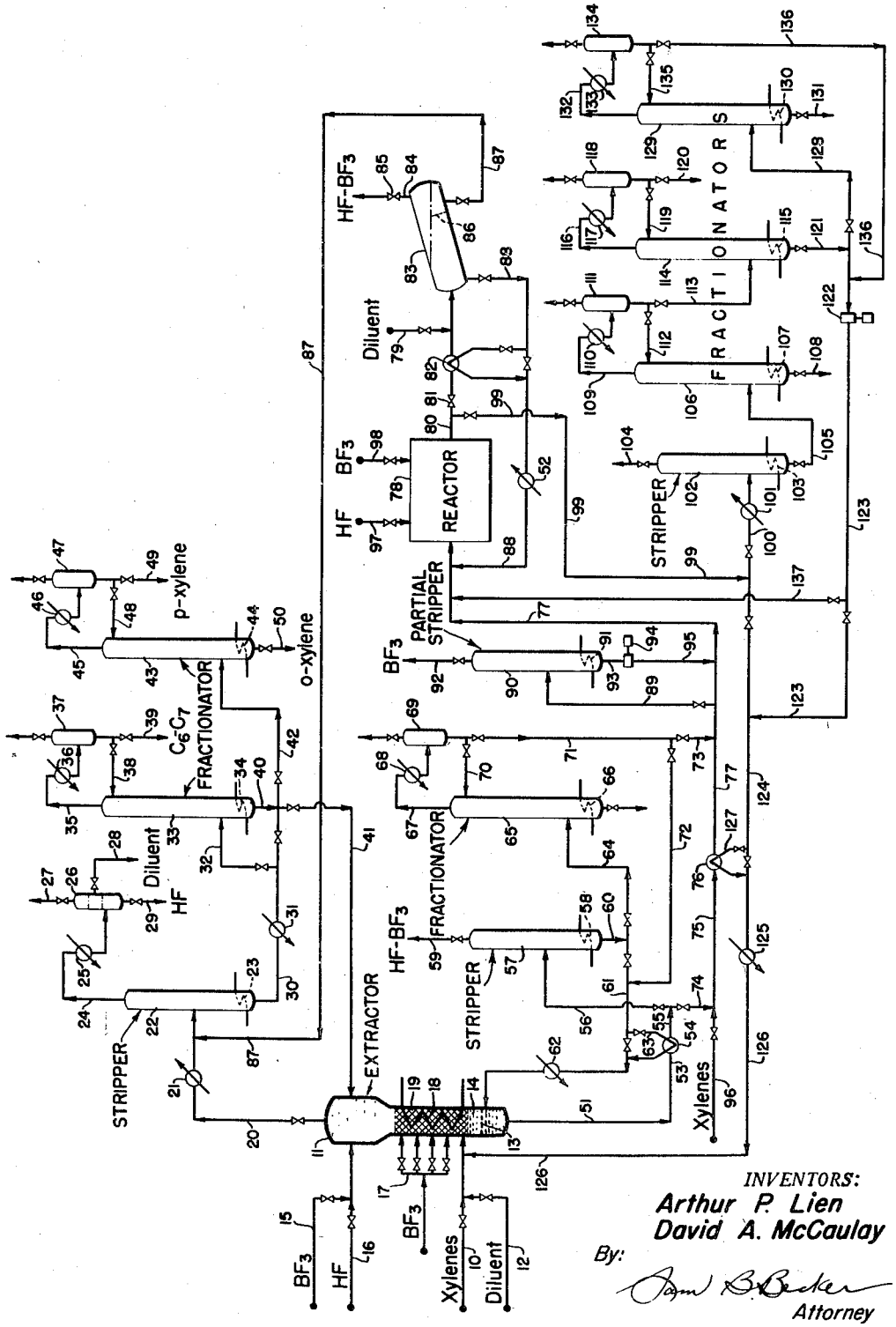
INVENTORS:
Arthur P. Lien
David A. McCaulay
By:
Attorney Patented Aug. 14, 1951

2,564,073

UNITED STATES PATENT OFFICE 2,564,073

DISPROPORTIONATION OF XYLENES

Arthur P. Lien, Hammond, Ind., and David A. McCaulay, Chicago, Ill., assignors to Standard Oil Company, Chicago, Ill., a corporation of Indiana Application August 25, 1948, Serial No. 46,135

17 Claims. (Cl. 260—672)

This invention relates to a process for the disproportionation of xylenes. More particularly, it relates to the disproportionation of a xylene, particularly meta-xylene, in the presence of catalysts consisting essentially of liquid hydrogen fluoride and $BF_3$. By the process of this invention, mesitylene and toluene can be readily produced in concentrated form by a commercially practicable sequence of operations. The process of this invention also renders possible the conversion of a meta-xylene concentrate to ortho- and para-xylene concentrates, toluene and mesitylene.

Although the disproportionation of xylenes has been extensively studied, no process of commercial significance has thus far been developed. The principal catalysts heretofore studied have been Friedel-Crafts type metal halides, particularly aluminum chloride. The prior art processes for the disproportionation of xylenes have been handicapped by large catalyst requirements and consumption, tar and sludge formation, inability to regenerate the metal halide catalysts which were employed and the relatively low yields of mesitylene and high yields of unwanted trimethylbenzenes, viz., 1,2,3- and particularly 1,2,4-trimethylbenzenes which were obtained. In contrast, by the process hereinafter detailed, xylenes can be disproportionated in essentially quantitative yield to produce toluene and a highly concentrated mesitylene product.

There is a large unsatisfied commercial demand for polycarboxylic acids, particularly aromatic polycarboxylic acids, for the production of alkyd type resins and plastics. It is possible to oxidize mesitylene to the corresponding 1,3,5-benzene tricarboxylic acid which would be valuable for the above mentioned uses. Another very valuable use of mesitylene is as a component of premium high octane fuels. Of all the hydrocarbons tested thus far, mesitylene is among the highest in clear CFR-R octane number. It has the highest blending octane number of any pure hydrocarbon tested thus far. A comparison of the octane number of mesitylene with other aromatic hydrocarbons is shown in the following table:

| | CFR-R Octane Numbers | |
|---|---|---|
| | Clear | Blending O. N. |
| Mesitylene | Iso-octane+6 cc. TEL | 171 |
| Cumene | Iso-octane+2.1 cc. TEL | 132 |
| o-Xylene | | 120 |
| m-Xylene | | 145 |
| p-Xylene | | 146 |

The blending octane numbers were obtained on blends of 20 percent of the aromatic hydrocarbon with 80% of a 60 octane number standard reference fuel. It will be apparent that the conversion of any of the xylenes to mesitylene results in a significant octane number increase, which is especially noteworthy in the case of ortho-xylene which has the lowest blending octane number. It should also be noted that mesitylene is isomeric with cumene which was extensively used as a high octane number aviation gasoline component, has similar physical properties, e. g., volatility characteristics, and would thus be a valuable constituent of safety fuels.

In our process, a xylene concentrate, comprising any one of the isomeric xylenes or a mixture thereof, e. g., hydroformate xylene, is contacted with a catalyst comprising HF plus $BF_3$. Suitable conditions for the conversion are temperatures of about 200° F. to about 600° F., preferably about 250° F. to about 350° F., amounts of HF between about 3 and about 20 mols per mol of xylene feed, and amounts of $BF_3$ between about 0.01 and about 3 mols per mol of xylene. Sufficient reaction time is allowed to afford substantial disproportionation, e. g., between about 2 minutes and about 4 hours.

It is preferred to employ a reaction mixture containing at least 0.5 mol of $BF_3$ per mol of xylene charging stock, e. g., between about 0.5 and about 3 mols of $BF_3$ per mol of xylenes. The presence, in the reaction mixture, of at least 0.5 mol of $BF_3$ per mol of xylenes results, in effect, in the segregation of the mesitylene produced in the reaction as a complex with HF and $BF_3$ containing one mol of $BF_3$ per mol of mesitylene. A further advantage of high $BF_3$ concentration is that mesitylene is the predominant $C_9$ aromatic produced in the disproportionation reaction.

The reaction may be carried out in a batch type reactor equipped with mechanical agitation, or in a tower type reactor. The reaction products may be subjected to stripping action to completely separate the HF and $BF_3$; the hydrocarbons are thereafter fractionated to separate a toluene stream, a xylene stream for recycle to the process, and a mesitylene stream. In one modification of our process, only a portion of the $BF_3$ is flashed off, preferably about one mol of $BF_3$ being retained per mol of mesitylene in the product, whereupon by cooling to ambient temperature, a diphasic separation is obtained, mesitylene being concentrated as the lower HF—$BF_3$ complex, the bulk of the toluene and xylene being separated as raffinate.

The toluene produced by this process is of high purity and can be nitrated directly.

Analysis of unconverted xylenes derived from the process of this invention indicates that considerable xylenes isomerization has occurred concurrent with or prior to the xylenes disproportionation reaction. Surprisingly, the trimethylbenzenes produced by xylene disproportionation in the process of our invention consist almost wholly of mesitylene with small proportions of the order of 10 percent or even less of pseudocumene (1,2,4-trimethylbenzene). The high mesitylene concentration of our product is all the more surprising in view of the fact that it is far in excess of the amount which would be expected from thermodynamic equilibrium data (Wm. J. Taylor et al., "Heats, Equilibrium Constants, and Free Energies of Formation of the Alkylbenzenes Through $C_9H_{12}$ and of the Higher Normal Monoalkylbenzenes," presented before the Petroleum Division, American Chemical Society, April 8–12, 1946, Figure 5). The formation of mesitylene in such unexpectedly high concentration is believed to be attributable in some measure to the formation of a complex between mesitylene, $BF_3$ and HF; it is probably also due in some measure to the isomerization of any mesitylene isomers that might be produced in the course of the xylenes disproportionation reaction.

The disproportionation of xylenes in the presence of liquid hydrogen fluoride and $BF_3$ is a surprisingly clean cut, smooth reaction. No hydrocarbons other than toluene, xylenes and trimethylbenzenes have been observed by us in the disproportionation reaction products. This indicates that the more extensive and random disproportionation reactions encountered previously when aluminium chloride was employed as a catalyst are not encountered here. In addition to the products that we have observed by the operation of our process, aluminum chloride also yields some benzene, tetramethylbenzenes such as durene, and even higher molecular weight products.

When liquid hydrogen fluoride alone is employed as a catalyst for the disproportionation of xylenes, the principal trimethylbenzene reaction product is pseudocumene. Also, the amount of polymethylbenzenes of higher molecular weight than trimethylbenzenes produced by the use of liquid HF as the catalyst is often equal to and, in many instances, even greater than the amount of trimethylbenzenes produced. By the employment of $BF_3$ with liquid hydrogen fluoride, we have found it possible, first, to suppress disproportionation and condensation reactions which proceed to form products of higher molecular weight than trimethylbenzenes and, secondly, to produce mesitylene, predominantly, as the $C_9$ aromatic hydrocarbon product. Both of these results are entirely unexpected in view of the action of liquid hydrogen fluoride when employed alone as a catalyst for the disproportionation.

Whereas it appears that mesitylene is preferentially dissolved by liquid hydrogen fluoride and $BF_3$, the other xylene disproportionation product, viz., toluene, is not.

The disproportionation-extraction process of our invention finds suitable application in the treatment of individual xylene isomers, mixtures of any two or all three xylenes and in the treatment of xylene mixtures containing ethylbenzene and/or saturated hydrocarbons of close boiling range. The boiling points and freezing points of the xylenes, and of ethylbenzene which boils within the same range, are

| | B. P., °F. | F. P., °F. |
|---|---|---|
| o-Xylene | 291.95 | −13.32 |
| m-Xylene | 282.38 | −54.17 |
| p-Xylene | 281.03 | +55.87 |
| Ethylbenzene | 277.14 | −138.96 |

("Selected Values of Properties of Hydrocarbons," Nat. Bur. Stds., C461, November 1947, p. 67.)

Aromatic hydrocarbon charging stocks suitable for employment as feed stocks in the process of this invention can be prepared by a variety of processes, probably the most important of which is the catalytic hydroforming process. For the preparation of xylene-rich products, a desirable charge to hydroforming is a light naphthenic naphtha rich in dimethylcyclohexanes (boiling range about 230 to 280° F.). In this process a petroleum naphtha, which may be a virgin or cracked naphtha or mixture of both, is converted to aromatic hydrocarbons by contact with a solid, porous dehydrogenation catalyst at a temperature in the range of about 850° F. to about 1050° F., preferably in the presence of hydrogen. Suitable catalysts are oxides of metals of groups 2 to 6 of the periodic system, particularly oxides of 6th group metals such as chromium and molybdenum, preferably supported by alumina or magnesia. Excellent catalysts can be prepared by depositing about 4 to about 10% of molybdenum oxide upon an activated alumina. Suitable space velocities for hydroforming fall within the range of about 0.2 to about 4 volumes of the liquid charge per hour per volume of catalyst space. About 0.5 to about 8 mols of hydrogen can be charged to the process with each mol of naphtha feed stock. (Note also, G. Armistead, Jr., Oil and Gas, J. 45, 17 (August 31, 1946) pp. 85–7 and 100; L. R. Hill et al., Trans. Am. Inst. Chem. Eng. 42, 4 (August 25, 1946), pp. 611–637).

Other sources of xylenes and other aromatic hydrocarbon charging stocks for employment in our process are catalytic cracking, catalytic dehydrogenation of naphthenes over dehydrogenation catalysts such as $NiS$—$WS_2$ or the like, thermal cracking at high temperatures, preferably in the presence of steam, for example as in the Forward process; the extraction or extractive distillation of virgin naphthas and kerosenes with selective solvents such as phenol, methanol, ethylene glycol, furfural, $SO_2$ and the like; the coking of coal, which yields a light aromatic oil from which it is conventional practice to produce nitration grade xylenes, etc. The above-mentioned processes for the preparation of aromatic hydrocarbons suitable as charging stocks for our process are illustrative only.

Suitable xylene mixtures which can be used as charging stocks in our process have been analyzed by A. D. Streiff and F. D. Rossini. These investigators have reported the results of analysis, by measurements of freezing points of appropriate mixtures, supplemented by analytical distillation, of the four individual $C_8$ alkylbenzenes (ethylbenzene, o-xylene, m-xylene and p-xylene) occurring in the product from the following five different catalytic petroleum refining processes: (1) "Hydroforming," (2) "two-pass fixed bed" catalytic cracking, (3) "three-pass fixed bed" catalytic cracking, (4) "low-temperature fluid" catalytic cracking, and (5) "high-temperature fluid" catalytic cracking. The data indicate that the relative amounts by volume of the four C8 alkylbenzenes are not greatly different in the five different products, being, on the average, as follows: ethylbenzene, 12; o-xylene, 21; m-xylene, 48; p-xylene 19%. These amounts correspond substantially to those called for in chemical thermodynamic equilibrium for the operating temperatures involved (J. Res. Nat. Bur. Standards 37, August 1946), p. 117, Fig. 4). The naphthenic plus paraffinic hydrocarbon content of the samples varied from about 7 to about 45 per cent by volume. ("Alkylbenzenes in the C8 fraction from five different catalytic petroleum refining processes," J. Res. Nat. Bur. Standards 39 (October 1947), pp. 303–308.)

The disproportionation reaction may be effected in a system containing one liquid phase (homogeneous phase reaction) which contains at least one mol of $BF_3$ combined per mol of xylenes in the isomerization reaction zone or in a two-liquid system (heterogeneous phase reaction) when less than one mol of $BF_3$ is employed per mol of xylene charging stock in the reaction zone.

The following is an example which is adduced for illustrative purposes only. The apparatus employed was a 1570 cc. carbon steel autoclave fitted with a 1725 R. P. M. mechanical stirrer. A 258 g. sample of a meta-xylene concentrate, 290 cc. of liquid hydrogen fluoride and 47 g. of $BF_3$ were stirred in the reactor at 250° F. for 25 minutes. At this temperature the reactor pressure was 270 p. s. i. g. The reactor was then cooled to 75° F. and the HF and $BF_3$ were removed from the reaction mixture by vacuum distillation. The hydrocarbon product, which amounted to 96 per cent by weight of the charging stock, was fractionated in a column packed with wire gauze equivalent to 30 theoretical plates and was found to have the following composition:

|  | Vol. Per Cent | Mol Per Cent |
|---|---|---|
| Toluene | 22 | 26 |
| Xylenes | 47 | 47 |
| Trimethylbenzenes | 31 | 27 |

It is evident that under the conditions of the experiment about 50% of the xylene was converted to toluene and to a trimethylbenzene which has been identified by its physical properties and ultraviolet spectrum as a mixture of about 90% mesitylene and about 10% of 1,2,4-trimethylbenzene. In the following tabulation, the ultraviolet analysis of the C8 cut is compared with the composition of the feed and with the thermodynamic equilibrium composition:

|  | Mol Per Cent | | |
|---|---|---|---|
|  | Feed | Product (C-8 Cut) | Equilibrium [1] |
| o-Xylene | 1.3 | 17.8 | 17 |
| m-Xylene | 82.3 | 56.3 | 58 |
| p-Xylene | 13.8 | 22.3 | 23 |
| Ethylbenzene | 2.4 | 2.4 | 2 |

[1] F. D. Rossini, Report on Chemical Thermodynamic Properties, A. P. I. Research Project 44, Mar. 31, 1947; Fig. 35.

Following the reaction, the products, or a fraction thereof, may be subjected to selective extraction with liquid hydrogen fluoride and $BF_3$. We have observed that liquid hydrogen fluoride and $BF_3$, when employed as a selective reaction solvent under appropriately selected operating conditions effect the selective extraction of meta-xylene from the xylenes isomeric therewith. Although benzene and toluene have been stated to form complexes with liquid HF and $BF_3$, we have observed that such complexes, if they are formed at all, are completely dissociated (i. e. they do not exist as such) at temperatures as low as 0° C.

Also, when a solution of xylenes in liquid HF and $BF_3$ is treated to withdraw sufficient $BF_3$ to reduce its concentration below 1 mol per mol of aromatic hydrocarbons contained in said solution, the solution can be readily separated into two layers by conventional means such as settling, centrifuging or the like. Analysis of the two resultant layers indicates that the xylene isomers are distributed in different proportions in the two layers, viz., the "raffinate" layer which is characterized by containing only small amounts of HF and $BF_3$ and which consists essentially of complex-free xylene isomers and the "extract" layer which consists of $BF_3$—HF-xylene isomers dissolved in excess liquid HF. The distribution of xylene isomers in the "raffinate" and extract layers is essentially the same as would be produced by initially contacting the xylene with a molar excess of liquid HF and with $BF_3$ in an amount less than 1 mol per mol of xylenes. The withdrawal of $BF_3$ from the solution containing xylene can be effected by various methods which will be pointed out in some detail hereinafter.

The selective extraction process which we employ appears to function through the formation of $BF_3$—HF-aromatic hydrocarbon complexes which appear to be definite chemical compounds. A study of these complexes has indicated that the aromatic hydrocarbon, particularly meta-xylene or other xylene, and $BF_3$ are present in the complexes in equimolar ratio. The various $BF_3$—HF-aromatic hydrocarbon complexes differ from each other in their stability, as evidenced by the different partial pressure of $BF_3$ which is present over the different complexes at a given temperature. Our study of the $BF_3$—HF-isomeric xylene complexes has shown that the relative stability of the meta-, ortho- and para-xylene complexes, respectively, is 20:2:1. We have further found that the relative stabilities of the complexes with the isomeric xylenes with $BF_3$ and HF can be substantially correlated with the actual extractabilities of the individual xylenes by liquid hydrogen fluoride and $BF_3$.

We have also found that the selective extraction of a mixture of xylenes with liquid hydrogen fluoride and $BF_3$ may be treated by the mathematical methods of analysis heretofore applied in the study of fractional distillation operations. The symbol, $\alpha$, corresponds, in fractional distillation terminology, to the enrichment factor and equals the ratio of the relative volatilities of the components being distilled (or the molar ratio of a given component in the vapor phase to the other components of the vapor phase divided by the molar ratio of the same component in the liquid phase relative to the other components in the liquid phase). In extraction, the extract phase can be treated as the vapor phase and the raffinate as the liquid phase of distillation. In our experimental work we have found that the alpha ratios of meta-, ortho- and para-xylenes were 15.3:1.47:1 at 0° C., which is considered to be good agreement with their stability equilibrium ratios of 20:2:1 (supra) as determined by vapor pressure measurements of the individual xylene complexes at the same temperature.

The following is an example of a typical extraction operation. A batch extraction experiment was carried out in a 1570 cc. carbon steel autoclave fitted with a 1725 R. P. M. mechanical stirrer. A sample of a C8 cut of hydroformer xylenes was introduced into the reactor along with liquid HF. Next, BF3 was admitted from a small weighing cylinder and the mixture was stirred for one-half hour at 68–77° F. The initial reactor pressure was 350 p. s. i. g., but when stirring was started the pressure immediately fell to 0 p. s. i. g., showing that the BF3 was absorbed. At the end of the stirring period the mixture was allowed to settle, and the two phases were separated. The HF and BF3 were removed from the extract phase by vacuum distillation and the composition of the extract, as well as the composition of the raffinate and the feed were determined by fractionation and by ultraviolet absorption analysis. The results of the experiment are shown in the following table. The difference in composition between the raffinate and extract shows that meta-xylene was selectively extracted by the HF—BF3.

TABLE

*Batch extraction of hydroformer xylenes with HF—BF3*

REACTOR CHARGE

Hydroformer xylenes, 239 g. (2.25 mols)
BF3, 93 g. (1.4 mols)
HF, 354 g. (17.7 mols)

RESULTS
[Total hydrocarbon recovery=94 wt. per cent.]

|  | Wt., g. | Wt. Per Cent | Ultraviolet Absorption Analysis, Wt. Per Cent | | | | |
|---|---|---|---|---|---|---|---|
|  |  |  | o-Xylene | m-Xylene | p-Xylene | Ethylbenzene | Total |
| Feed | 239 | 100 | 19.6 | 41.2 | 16.7 | 19.7 | 97.2 |
| Raffinate | 95.3 | 42.5 | 26.1 | 17.7 | 23.3 | 26.1 | 93.2 |
| Extract | 128.6 | 57.5 | 19.4 | 60.7 | 12.5 | 0.1 | 92.7 |

|  | Individual Hydrocarbon Balance, Wt. Per Cent | | | |
|---|---|---|---|---|
|  | Ortho- | Meta- | Para- | Ethylbenzene |
| Feed | 19.6 | 41.2 | 16.7 | 19.7 |
| Raffinate plus Extract | 22.3 | 43.2 | 17.0 | 11.2 |
| Balance | +2.7 | +2.0 | +0.3 | −8.5 |

|  | Fractionation Analysis of Products, Volume Per Cent | |
|---|---|---|
|  | Raffinate | Extract |
| Benzene |  | 0 |
| C8 Aromatics | 2 | 83 |
| C10 Aromatics | 98 | 17 |
|  | 0 |  |
|  | 100 | 100 |

From the data presented in the above table, it will be noted that 57.5% of the feed, which is equivalent to 1.3 mols of xylenes, dissolved in the HF—BF3 and that 93 g. or 1.4 mols of BF3 were used, which within experimental error is equal to the mols of xylenes present in the extract phase.

The single stage separation factor $\alpha$ of meta-xylene is $$\alpha = \frac{1-N'}{N'} \Big/ \frac{1-N}{N} = \frac{1-.177}{.177} \Big/ \frac{1-.607}{.607} = 7.2$$

where $N'$ and $N$ are the mol fractions of meta-xylene in the raffinate and extract respectively. This is a very high separation factor and it can be calculated by the use of a McCabe-Thiele graphical analysis that a system of only four stages is needed to separate hydroformer xylenes into an overhead product comprising 95% ortho- and para-xylenes and a bottoms product containing 95% meta-xylene. The distribution of ortho- and para-xylenes obtained in the present extraction is consistent with $\alpha$ values of 0.69 and 0.47. The $\alpha$ ratios of meta-, ortho- and para-xylenes are, therefore, 15.3:1.47:1.

The individual hydrocarbon balance in the above table shows, within experimental error, that all three xylenes remained unchanged during the run; i. e., they neither isomerized nor disproportionated. However, there is a net disappearance of ethylbenzene and the results of the fractionation analyses of the products show that the ethylbenzene tended to disproportionate to form benzene plus diethylbenzenes and ethylxylenes. This disproportionation immensely simplifies the xylene separation problem since ethylbenzene is thereby removed far from the boiling range of the xylenes.

One illustrative embodiment of the process of this invention will be described with reference to the accompanying figure. The xylene charge may be a mixture consisting of the isomeric xylenes, ethylbenzene and associated saturated hydrocarbons boiling in the range of about 270 to 300° F., such as is conventionally produced in hydroforming processes.

The feed stocks to the initial extraction operation should be substantially free of water, since water is tenaciously retained by both HF and BF3. Conventional drying procedures may be used to treat the feed stocks. The xylenes charge is passed through valved line 10 into extraction tower 11. If desired a low boiling diluent may be introduced with the xylene charging stock through valved line 12 in amounts between about 0.1 and about 5 volumes (preferably about 0.8 to 1.5 volumes) per volume of charging stock. Suitable diluents comprise low boiling saturated hydrocarbons such as n- or isobutane, pentanes, hexanes, heptanes, octanes; low boiling cycloparaffinic hydrocarbons such as cyclopentane, methyl- and dimethylcyclopentanes, cyclohexane, methylcyclohexane; and the like. The extraction in tower 11 is conducted in such a manner that two immiscible phases are present therein, viz., a lower extract phase whose upper surface is indicated by meniscus 13 and a supernatant raffinate phase 14 above meniscus 13. BF3 and liquid hydrogen fluoride are introduced into the upper portion of the extraction tower through valved lines 15 and 16, respectively. Part or all of the diluent may be introduced (by lines not shown) directly into the extract phase below meniscus 13 in tower 11.

Although we prefer to employ essentially anhydrous hydrogen fluoride, i. e., HF containing not more than 1 to 2 weight percent of water, we employ HF containing up to about 5 to 10 weight percent of water. By HF, as used herein, we intend to denote the molecular species having a molecular weight of 20 which weight is employed in the necessary calculations.

Extraction tower 11 is provided with a manifold 17 to permit the introduction of BF₃ at various levels in the extraction tower. All or a portion of the HF and/or BF₃ may also be added to the charging stock at a point or points in advance of the extraction tower 11 and additional HF or BF₃ can then be added as described above. Extraction tower 11 is provided with a cooling coil or an equivalent such as a cooling jacket, 18, to remove the heat generated in the extraction operation. Liquid meta-xylene reacts with liquid HF and gaseous BF₃ (one mol of each) to form a complex with the liberation of 2.9 K cal. In order to improve the efficiency of contacting in tower 11 a bed of a packing material 19 is provided. The packing material comprises shaped solid fragments resistant to the action of HF and BF₃, for example, carbon Monel metal, copper, certain magnesium-aluminum alloys and the like.

In the extraction tower the xylene charging stock is contacted with a counterflow of a molal excess of liquid hydrogen fluoride (between about 5 and about 50 mols per mol of xylenes contained in said charging stock) and BF₃ in an amount between about 0.2 and about 0.8 mol per mol of xylenes contained in said charging stock at a temperature between about 0° F. and about 150° F. under pressure sufficient at least to maintain the liquid phase, for a period of time sufficient to effect selective extraction, usually between about 1 and about 30 minutes. Usually it is preferred to employ about 1 mol of BF₃ per mol of meta-xylene contained in the charging stock and an additional amount of BF₃ equivalent to about 0.5 mol per mol of ethylbenzene contained in the charging stock. In general, our preferred extraction operation entails the employment of between about 7 and about 15 mols of HF and between about 0.4 and about 0.7 mol of BF₃ per mol of xylenes charging stock at a temperature between about 60° F. and about 100° F. for a period of time between about 5 and about 15 minutes.

The raffinate phase derived from the selective meta-xylene extraction and ethylbenzene disproportionation operation is characterized by a greatly reduced content of meta-xylenes as compared with the amount of meta-xylene in the charging stock entering tower 11. The raffinate is taken overhead from selective extraction tower 11 through valved line 20 and heat exchanger 21 into stripping tower 22 provided with a reboiler coil 23. Stripping tower 22 is operated at a top temperature between about 150° F. and about 250° F. and a bottom temperature between about 250° F. and about 400° F. and a pressure between about 0 and about 100 p. s. i. g. to remove substantially all of the relatively small amounts of HF and BF₃ carried from tower 11 by the raffinate phase. When a diluent is employed in tower 11 it, too, will be stripped from the raffinate in tower 22. The distillate passes overhead through line 24 and partial condenser 25 into an accumulator and settling drum 26, from which BF₃ is discharged overhead through valved line 27. A stratum of diluent is withdrawn through valved side line 28 and liquid hydrogen fluoride saturated with BF₃ is discharged through valved line 29. It will be obvious that all the effluents of drum 26 may be reemployed in the various extraction or isomerization-disproportionation operations.

Stripped raffinate hydrocarbons are discharged from tower 22 through line 30 whence they pass through heat exchanger 31. Since the disproportionation of ethylbenzene yields benzene, and since small amounts of toluene may be included in the xylene charging stock, it may be desired to divert the stripped raffinate phase from heat exchanger 31 through valved line 32 into fractionating tower 33 provided with a reboiler coil 34. Benzene and toluene are taken overhead from this tower by line 35 through condenser 36 into accumulator drum 37, whence a portion may be recycled through valved line 38 to reflux tower 33 and the remainder diverted through valved line 39. The tower bottoms consist essentially of a mixture of ortho- and para-xylenes, possibly containing a small proportion of meta-xylene. The bottoms fraction in tower 33 is discharged through line 40, whence a portion may be passed through valved line 41 for recycle to extraction tower 11. All or the remainder of the xylene bottom fraction from tower 33 is passed through valved line 42 into fractionating tower 43 provided with a reboiler coil 44. In tower 43 a para-xylene fraction is taken overhead through line 45 and condenser 46 into accumulating drum 47, whence a portion is withdrawn through valved line 48 to reflux tower 43 and the remainder is removed through valved line 49. A small proportion of unconverted ethylbenzene may be present in the para-xylene fraction. In tower 43, the bottoms, consisting essentially of ortho-xylene, is withdrawn through valved line 50.

An extract phase which is substantially enriched in meta-xylene, relative to its concentration in the charging stock, is withdrawn from tower 11 through line 51 and is then passed through line 53 and heat exchanger 54 into line 55, whence all or a portion may be diverted through valved line 56 into a stripper 57 which is operated under similar conditions to those prevailing in stripper 22. Stripper 57 is provided with a reboiler coil 58. HF and BF₃ are taken overhead from stripper 57 through valved line 59 for recycle to extraction or xylene disproportionation. Low boiling saturated hydrocarbons such as propane, butanes, pentanes, etc. may be introduced into tower 57 to facilitate the stripping operation. The bottoms in tower 58 comprise essentially a meta-xylene concentrate which also contains diethylbenzenes produced by the disproportionation of ethylbenzene in tower 11 (mostly meta-diethylbenzene) and ethylxylenes also produced in the disproportionation reaction (predominantly 1-ethyl-3,5-dimethylbenzene).

The bottoms from tower 57 are removed through line 60, whence all or a portion is recycled to tower 11 through valved line 61 and cooler 62. If desired, the stream passing through line 61 may be partially or wholly diverted by valved line 63 through heat exchanger 54 before passing into heat exchanger 62. All or a portion of the bottoms from tower 57 may be diverted through valved line 64 into fractionating tower 65 provided with reboiler coil 66. A meta-xylene fraction is taken overhead from tower 65 through line 67 and condenser 68 into accumulator drum 69, whence a portion is recycled through valved line 70 to reflux tower 65 and the remainder is passed into line 71. From line 71 a portion of the meta-xylene fraction may be diverted through valved line 72 into line 61 for recycle to the lower portion of tower 11 to backwash the extract phase therein. A substantial proportion of the meta-xylene fraction is passed through valved line 73 as charge to the xylene disproportionation process to be described hereinafter.

The $C_{10}$ aromatic hydrocarbons which accumulate as bottoms in tower 65 may be discharged from time to time through a valved line.

If it is not desired to strip HF, $BF_3$ and $C_{10}$ aromatic hydrocarbons from the concentrate of meta-xylene in liquid HF—$BF_3$ passing through line 55, this stream may be wholly or partially diverted through valved line 74 to pass to the xylenes disproportionation operation. From valved line 74 the homogeneous solution of meta-xylene and small proportions of ortho- and para-xylenes, in liquid HF—$BF_3$, containing also some $C_{10}$ aromatic hydrocarbons produced by the disproportionation of ethylbenzene, is passed into line 75, thence through heat exchanger 76 into line 77 and a reactor schematically represented at 78. A saturated hydrocarbon diluent such as may be employed in extraction tower 11 may likewise be introduced by line 79 into line 80 in amounts between about 0.2 and about 3 volumes per volume of hydrocarbon charging stock therein contained. The diluent may be passed into reactor 78 through valved line 79 which discharges into manifold 77.

The homogeneous concentrate of meta-xylene in liquid HF—$BF_3$ is subjected, in reactor 78, to a temperature between about 200° F. and about 600° F., preferably about 250° F. to about 350° F. under a pressure sufficient to maintain the liquid phase and for a period of time sufficient to effect substantial xylenes disproportionation and isomerization, say, between about 2 minutes and about 4 hours.

When the reaction is conducted in homogeneous phase, the resultant reaction mixture is preferably discharged from reactor 78 through line 80, valve 81 and heat exchanger 82 into drum 83. In drum 83 sufficient $BF_3$ is removed from the reaction products to reduce its concentration below one mol per mol of xylenes and $C_9$–$C_{10}$ aromatic hydrocarbons contained in the reaction mixture. Preferably sufficient $BF_3$ is vented through line 84 and pressure control valve 85 to reduce the concentration of $BF_3$ in the liquid in the drum to a value between about 0.5 and about 0.75 mol per mol of xylenes and $C_9$–$C_{10}$ aromatic hydrocarbons contained therein. Upon partial stripping of the $BF_3$ from the liquid contents of drum 83, the homogeneous liquid phase therein separates into two liquid phases, viz., a supernatant "raffinate" phase which consists predominantly of ortho- and para-xylenes, toluene and possibly some pseudocumene and hemimellitene which flows over weir 86 into the upper portion of settling drum 83, and a lower "extract" phase which consists essentially of a solution of meta-xylene and $C_9$ aromatic hydrocarbons, principally mesitylene, in liquid HF and $BF_3$ which settles into the lower portion of drum 83.

The raffinate phase in drum 83 is withdrawn through valved line 87, whence it passes into stripper 22, whose operation has been described above, to be treated for the removal of HF and $BF_3$ and for further treatment, if desired, in fractionating tower 33 and/or 43 to separate ortho- and para-xylenes concentrates, respectively. Additional fractionation facilities may be provided to separate toluene which distills with the para-xylene fraction and to separate $C_9$ aromatics from the ortho-xylene bottoms in tower 43.

The extract phase in the lower portion of drum 83 may be withdrawn through valved line 88, heat exchanger 52 and manifold 77 for recycle to reactor 78. If desired, all or a portion of the stream passing through line 88 may be diverted through a valved line into heat exchanger 82 as a heat conservation measure. Mesitylene is produced by xylenes disproportionation in reactor 78 and will be present in the HF—$BF_3$ solution in the lower portion of drum 83. The continued recycle of mesitylene to reactor 78 with the stream in line 88 tends to prevent its continued formation, so that it is desirable to treat the stream in line 88 from time to time, to remove its mesitylene content. This may be accomplished by stripping off HF and $BF_3$ and fractionally distilling the residual hydrocarbons into a $C_9$ bottoms fraction and a xylenes distillate, which distillate is then recycled to reactor 78.

An advantage of xylenes disproportionation in homogeneous liquid phase is that little or no stirring is required to effect intimate contacting of the reactants and catalysts. However, heterogeneous (two immiscible) liquid phase disproportionation may be practiced in certain instances. Although more or less intensive stirring or agitation or other means of contacting is required in reactor 78 when two immiscible phases are present during reaction, this mode of operation has the advantage that the meta-xylene can be retained for the most part in solution in the catalyst phase and the ortho- and para-xylene isomerization products and toluene, produced by xylenes disproportionation, are for the most part discharged from the catalyst solution. The reaction mixture may then be conveniently discharged through line 80 into drum 83 which in this mode of operation can serve simply as a settling drum whence the meta-xylene solution in liquid HF—$BF_3$ can be recycled through line 88 to reactor 78 and a "raffinate" layer withdrawn through line 87 for treatment as hereinbefore described. The $BF_3$ content of the HF—$BF_3$-xylenes solution passing through manifold 77 may be suitably adjusted in order to obtain two liquid phases for heterogeneous-phase reaction by diverting at least a portion of said stream through valved line 89 into a stripper 90 provided with a heating coil 91. Sufficient $BF_3$ is withdrawn through valved line 92 to reduce the $BF_3$ concentration in the solution to substantially less than 1 mol per mol of xylenes (and $C_{10}$ aromatic hydrocarbons); the partially stripped solution is discharged from tower 90 through line 93 whence it is forced by pump 94 into line 95 and thence into reactor 78.

If desired, the xylene charging stock may be passed into reactor 78 without first being subjected to extraction in tower 11. Thus a xylene mixture containing ethylbenzene and saturated hydrocarbons may be introduced through valved line 96 into line 75 and thence through heat exchanger 76 and manifold 77 into reactor 78. In this case it will be necessary to charge HF and $BF_3$ directly to the reactor, by valved lines 97 and 98, respectively. When the xylenes charge containing ethylbenzene is charged directly to reactor 78, ethylbenzene disproportionation and reaction with xylenes will accompany the isomerization and disproportionation of xylenes and will yield benzene, diethylbenzenes and ethylxylenes as additional products. The reaction products may be processed in drum 83 as described above. However, a desirable alternative method of operation involves stripping HF and $BF_3$ from the reaction products, separation of aromatic hydrocarbons having molecular weights above and below xylene and, if desired, fractional distillation of the remaining xylenes mixture. To this end the effluent from reactor 78 is passed through line 80, valved line 99, valved line 100 and heat exchanger 101 into stripper 102 provided with a reboiler coil 103, whence HF and $BF_3$ are removed overhead through valved line 104 and the stripped bottoms are discharged through valved line 105 into fractionating tower 106 provided with reboiler coil 107. A bottoms fraction comprising diethylbenzenes (predominantly meta-), ethylxylenes (predominantly 1,3,5-) and mesitylene and pseudocumene is discharged through valved line 108, and a distillate consisting essentially of benzene, toluene and xylenes is passed overhead through line 109 and condenser 110 into an accumulator drum 111, whence a portion is returned through valved line 112 as reflux to tower 106 and the remainder is discharged through valved line 113 into fractionating tower 114 equipped with reboiler coil 115. Mesitylene may be separated from diethylbenzenes and ethylxylenes by further fractional distillation. In tower 114 a distillate boiling below the xylenes boiling range is taken overhead through line 116 and condenser 117 into an accumulator drum 118. This distillate includes benzene, toluene, and saturated hydrocarbon diluent boiling below the xylenes boiling range. A portion of condensate in accumulator drum 118 is recycled to tower 114 through valved line 119 and the remainder is discharged through valved line 120.

The bottoms in tower 114 consist essentially of a mixture of isomeric xylenes which are removed through valved line 121, whence they may be impelled by pump 122 through line 123 into line 124, thence through heat exchanger 125 and line 126 into line 10 and extraction tower 11 to be subjected to selective extraction with liquid hydrogen fluoride and $BF_3$ as described above. Heat conservation may be effected by diverting at least a portion of the stream flowing through line 124 through valved line 127 and heat exchanger 76. At least a portion of the xylene stream in line 123 is diverted through valved line 137 to reactor 78 to be further subjected to disproportionation.

If desired the isomeric xylene stream removed as bottoms from fractionating tower 114 may be subjected to further fractional distillation, being passed for this purpose from valved line 121 into valved line 128 and thence into fractionating tower 129 equipped with reboiler coil 130. An ortho-xylene concentrate may be removed as bottoms from tower 129 through valved line 131. A mixture of beta- and para-xylenes is removed overhead from tower 129 through line 132 and condenser 133 into an accumulator drum 134, whence a portion is recycled to tower 129 as reflux through valved line 135 and the remainder is removed through valved line 136 to pump 122 for recycle operation. If desired, the meta- and para-xylene mixture in line 136 may be employed as a feed stock in reactor 78 or in another reactor.

If desired, especially where heterogeneous phase reaction is effected in reactor 78, the product stream removed through lines 80 and 99 may be passed directly into line 124 for return to extraction tower 11.

Although the accompanying flow diagram features the employment of extraction towers, we may employ other conventional extraction equipment. For both extraction and isomerization and disproportionation operations we may employ equipment heretofore employed in the alkylation of isoparaffins by olefins in the presence of liquid hydrogen fluoride or sulfuric acid.

Although the accompanying figure depicts apparatus which may be employed in continuous processing it is apparent that the process of our invention may be operated in batch or semicontinuous equipment. Also it will be apparent that a plurality of extraction towers and reactors may be employed and that the extraction and reaction may be effected in a plurality of stages.

It will be apparent that the equipment featured in the accompanying figure permits great flexibility of operation and that numerous permutations and combinations of process flow and operation sequences are possible. These need not, however, be detailed here as they will be readily apparent to one skilled in the art. The above description has, accordingly, been devoted to a consideration of the primary process flows through the extraction and reaction units of this invention.

By "selective extraction," as used herein and in the appended claims, is meant not only the process of contacting a mixture of xylenes with added liquid hydrogen fluoride and $BF_3$ but also the process that involves removing $BF_3$ from an $HF$—$BF_3$-xylenes solution to produce two immiscible liquid phases.

The products of the present invention can be treated to remove small residual amounts of fluorine by convenional processes, such as contacting with adsorbent carbon, active clays, alumina, bauxite, NaF or other alkali metal fluorides, aqueous solutions of caustic, etc. as is well known in the art of defluorinating hydrocarbons.

Although HF and especially $BF_3$ are relatively expensive reagents and would of necessity be recovered in any large commercial application of the process of this invention, in small scale operations the recovery of these reagents might be considered immaterial. When the recovery of HF and $BF_3$ as such is not required, the distillation and stripping operations illustrated in the figure may be dispensed with. As an alternative to distillation of the extract phase, said phase may be mixed with water, alkaline or acidic solutions or the like which dissolve the HF and $BF_3$, leaving a supernatant hydrocarbon phase which may then be recovered and fractionated. A desirable acidic solution with which to treat the extract phase is the azeotropic $HF$—$H_2O$ solution, which becomes enriched in HF upon contact with the extract phase and from which the HF in excess of the azeotropic amount can thereafter be readily recovered by distillation. An alternative would be to distill free HF and $BF_3$ from the extract phase, following which the residual firmly bound $BF_3$—HF-xylene and $BF_3$—HF—$C_9$ aromatic hydrocarbon complex could be treated with water or aqueous alkaline or acidic solutions to liberate xylene and $C_9$ aromatic hydrocarbons bound in said complexes. In place of the aqueous solutions mentioned above, one may employ organic compounds capable of forming complexes with HF and $BF_3$ and which are capable of displacing xylenes, especially meta-xylene, mesitylene, m-diethylbenzene and ethylxylenes from their complexes with HF and $BF_3$, e. g., organic compounds having a more basic (greater electron-donating capacity) than the xylenes, especially meta-xylene. Such organic compounds include various amines, sulfur compounds, e. g., alkyl bis(thioethers), and oxygenated organic compounds such as phenol, alkyl ethers, ketones, aldehydes, etc.

Having thus described our invention, what we claim is:

1. A process which comprises contacting at least one xylene in the absence of any substantial proportion of benzene in a reaction zone with between about 3 and about 20 mols of liquid hydrogen fluoride per mol of said xylene and between about 0.01 and about 3 mols of $BF_3$ per mol of said xylenes at a temperature between about 250° F. and about 600° F., under a pressure sufficient at least to maintain a liquid phase to produce a mixture of isomeric xylenes and to effect disproportionation of a xylene to form toluene and mesitylene, subjecting the reaction products to selective extraction with liquid hydrogen fluoride in molar excess, based on total xylenes in said reaction products, and with $BF_3$ in an amount between about 0.2 and about 0.8 mol per mol of xylenes and mesitylene in said reaction products at a temperature between about 0° F. and about 150° F. under a pressure sufficient at least to maintain a liquid phase, separating the extraction mixture into a liquid hydrocarbon layer substantially enriched in ortho- and para-xylenes and toluene, and a solution of meta-xylene and mesitylene in liquid hydrogen fluoride and $BF_3$, and recycling at least a portion of said hydrocarbon layer to said reaction zone.

2. The process of claim 1 wherein the temperature in said reaction zone is between about 250° F. and about 350° F.

3. A process which comprises contacting at least one xylene in the absence of any substantial proportion of benzene in a reaction zone with between about 3 and about 20 mols of liquid hydrogen fluoride per mol of said xylene and between about 0.01 and about 3 mols of $BF_3$ per mol of said xylene at a temperature between about 250° F. and about 600° F., under a pressure sufficient at least to maintain a liquid phase to produce a mixture of isomeric xylenes and to effect disproportionation of a xylene to form toluene and trimethylbenzenes, subjecting the reaction products to selective extraction with liquid hydrogen fluoride in molar excess, based on total xylenes in said reaction products, and with $BF_3$ in an amount between about 0.2 and about 0.8 mol per mol of xylenes and mesitylene in said reaction products at a temperature between about 0° F. and about 150° F. under a pressure sufficient at least to maintain a liquid phase, separating the extraction mixture into a liquid hydrocarbon layer substantially enriched in ortho- and para-xylenes and toluene and a solution of xylenes and trimethylbenzenes in liquid hydrogen fluoride and $BF_3$ substantially enriched in meta-xylene and mesitylene with respect to said reaction products, separating a meta-xylene concentrate and a mesitylene concentrate, respectively, from said solution, withdrawing said mesitylene concentrate from the process, and recycling at least a portion of said meta-xylene concentrate to said reaction zone.

4. The process of claim 3 wherein the temperature in said reaction zone is between about 250° F. and about 350° F.

5. A process which comprises contacting a hydrocarbon mixture comprising meta-xylene and at least one xylene isomeric therewith in the absence of any substantial proportion of benzene in an extraction zone with liquid hydrogen fluoride in molar excess, based on total xylenes and with $BF_3$ in an amount between about 0.2 and about 0.8 mol per mol of total xylenes at a temperature between about 0° F. and about 150° F. under a pressure sufficient at least to maintain a liquid phase, separating the resultant mixture into a liquid hydrocarbon layer substantially enriched in an isomer of meta-xylene and an HF—$BF_3$ solution of xylenes substantially enriched in meta-xylene, with respect to the charging stock to said extraction zone, subjecting said HF—$BF_3$-xylenes solution in a reaction zone to a temperature between about 250° F. and about 600° F. under a pressure sufficient at least to maintain a liquid phase for a period of time sufficient to effect substantial disproportionation of xylenes, separating a xylenes fraction and xylene disproportionation products from reaction mixture and recycling at least a portion of said xylenes fraction to said reaction zone.

6. The process of claim 5 which comprises the additional step of recycling a portion of said xylene fraction to said extraction zone.

7. The process of claim 5 wherein the temperature in said reaction zone is between about 250° F. and about 350° F.

8. A process for the disproportionation of a xylene which comprises contacting a xylene in the absence of any substantial proportion of benzene in a reaction zone with liquid hydrogen fluoride in quantity sufficient at least to form a distinct liquid phase and with $BF_3$ in an amount between about 0.01 and about 3 mols per mol of said xylene at a temperature between about 250° F. and about 600° F. under a pressure sufficient at least to maintain a liquid phase, passing at least a portion of the resultant reaction mixture to a settling zone, withdrawing a solution comprising xylenes and mesitylene in liquid hydrogen fluoride and $BF_3$ from said settling zone, separating HF and $BF_3$ from the withdrawn solution and subjecting hydrocarbons thus derived from said solution to fractional distillation to separate a xylenes fraction and a mesitylene-containing fraction, withdrawing said mesitylene-containing fraction from the process and recycling at least a portion of the last-named xylenes fraction to said reaction zone.

9. The process of claim 8 wherein the temperature in said reaction zone is between about 250° F. and about 350° F.

10. A process for the production of mesitylene which comprises contacting a xylene in the absence of any substantial proportion of benzene with liquid hydrogen fluoride in quantity sufficient at least to form a distinct liquid phase and with at least about 0.5 mol of $BF_3$ per mol of said xylene at a temperature between about 200° F. and about 600° F. under a pressure sufficient at least to maintain a liquid phase and separating a $C_9$ fraction consisting essentially only of mesitylene from the reaction products.

11. A process for the production of mesitylene which comprises contacting a xylene in the absence of any substantial proportion of benzene with liquid hydrogen fluoride in quantity sufficient at least to form a distinct liquid phase and with at least about 0.5 mol of $BF_3$ per mol of said xylene at a temperature between about 200° F. and about 600° F. under a pressure sufficient at least to maintain a liquid phase, separating the reaction mixture into a predominantly hydrocarbon phase and a predominantly acid phase and separating mesitylene from said acid phase.

12. The process of claim 11 wherein the reaction temperature is about 250° F.

13. The process of claim 11 wherein the reaction temperature is between about 250° F. and about 350° F.

14. A process for the production of mesitylene which comprises contacting a mixture of hydroformate xylenes in the absence of any substantial proportion of benzene with liquid hydrogen fluoride in quantity sufficient at least to form a distinct liquid phase and with at least about 0.5 mol of BF₃ per mol of said xylenes at a temperature between about 250° F. and about 350° F. under a pressure sufficient at least to maintain a liquid phase, separating the reaction mixture into a predominantly hydrocarbon phase and a predominantly acid phase and separating mesitylene from said acid phase.

15. A process for the disproportionation of a xylene, which process comprises contacting a xylene in the absence of any substantial proportion of benzene in a reaction zone with liquid hydrogen fluoride in quantity sufficient at least to form a distinct liquid phase and with BF₃ in an amount between about 0.01 and about 3 mols per mol of said xylene at a temperature at between about 250° F. and about 350° F. under a pressure sufficient at least to maintain a liquid phase, thereafter vaporizing a portion of the BF₃ from the resultant reaction mixture and separating said reaction mixture by settling into a predominantly hydrocarbon phase comprising essentially toluene and xylenes and a predominantly acid phase comprising essentially liquid hydrogen fluoride and an HF—BF₃ complex of mesitylene.

16. The process of claim 15 wherein at least about 0.5 mol of BF₃ is employed per mol of said xylene in said reaction zone.

17. A process for the production of mesitylene which comprises contacting a xylene in the absence of any substantial proportion of benzene with liquid hydrogen fluoride in quantity sufficient at least to form a distinct liquid phase and with at least about 0.5 mol of BF₃ per mol of said xylene at a reaction temperature of at least about 200° F. for a period of time sufficient to effect substantial disproportionation of said xylene under a pressure sufficient at least to maintain a liquid phase and separating a C₉ fraction consisting essentially of mesitylene from the reaction products.

ARTHUR P. LIEN.
DAVID A. McCAULAY.

REFERENCES CITED

The following references are of record in the file of this patent:

UNITED STATES PATENTS

| Number | Name | Date |
|---|---|---|
| 2,396,965 | Passino | Mar. 19, 1946 |
| 2,397,495 | Lien et al. | Apr. 2, 1946 |
| 2,416,184 | Lee et al. | Feb. 18, 1947 |